United States Patent
Tanaka et al.

[11] Patent Number: 5,883,170
[45] Date of Patent: Mar. 16, 1999

[54] COATING COMPOSITION AND COATED METAL PLATE USING IT

[75] Inventors: Shoichi Tanaka; Takashi Nakano, both of Kanagawa, Japan

[73] Assignee: Kansai Paint Co., Ltd., Amagasaki, Japan

[21] Appl. No.: 979,155

[22] Filed: Nov. 26, 1997

[51] Int. Cl.$^6$ .............. C08K 3/10; C08F 20/00; B32B 15/08
[52] U.S. Cl. ............ 524/413; 525/443; 428/458
[58] Field of Search .............. 524/413; 525/441, 525/443; 428/458

[56] References Cited

U.S. PATENT DOCUMENTS

| | | | |
|---|---|---|---|
| 3,607,975 | 9/1971 | Tsukada et al. | 525/443 |
| 3,647,755 | 3/1972 | Giller | 525/443 |
| 3,741,799 | 6/1973 | Kulhanek | 525/443 |
| 4,634,738 | 1/1987 | Santer | 525/443 |
| 4,714,657 | 12/1987 | Quinn et al. | 525/443 |
| 4,734,467 | 3/1988 | Yamada et al. | 525/443 |
| 4,789,707 | 12/1988 | Nishimura et al. | 525/443 |
| 4,999,055 | 3/1991 | Holtzen et al. | 524/413 |
| 5,306,567 | 4/1994 | Kuo et al. | 525/443 |
| 5,385,960 | 1/1995 | Emmons et al. | 523/205 |
| 5,681,890 | 10/1997 | Tanaka et al. | |
| 5,739,215 | 4/1998 | Westerhof et al. | 525/443 |

FOREIGN PATENT DOCUMENTS

| | | |
|---|---|---|
| 08245905 | 9/1996 | Japan . |
| 08245906 | 9/1996 | Japan . |

*Primary Examiner*—Veronica P. Hoke
*Attorney, Agent, or Firm*—Foley & Lardner

[57] ABSTRACT

A coating composition for coating metal plates comprising a hydroxyl group-containing polyester resin having a number average molecular weight of 1,500 to 30,000, a glass transition temperature of −20° to 40° C. and a hydroxyl value of 3 to 50 mg KOH/g; a melamine resin curing agent comprising a methyl etherified melamine resin and a butyl etherified melamine resin; a curing catalyst comprising an optionally neutralized sulfonic acid compound; a secondary amine compound having a boiling point of 30° to 250° C.; and optionally titanium dioxide.

24 Claims, No Drawings

COATING COMPOSITION AND COATED METAL PLATE USING IT

BACKGROUND OF THE INVENTION

1. Field of the Invention

The present invention generally relates to a coating composition having good coating properties and that is capable of forming a coating film which is excellent in film hardness, processing property, pollution resistance and acid resistance. More particularly, the present invention relates to a coating composition suitable for precoated steel plates used in the manufacture of vessels, and/or coated metal plates prepared with the composition of the present invention.

2. Description of the Related Art

Heretofore, as topcoating compositions for precoated steel plates used in the manufacture of vessels, coating compositions have often been used that are obtained by blending a mixture of a polyester resin (a basic resin) and a methyl etherified methylol melamine resin (a cross-linking agent) with a curing catalyst. This is typically because such coating compositions possess an excellent balance between hardness and processing property. Processing property generally refers to the durability of the coating when subjected to pressing or bending processes. That is, a coating which does not crack or peel off under pressing or bending is said to have an excellent processing property.

With regard to conventional precoated steel plates used in the manufacture of the vessels, characteristics such as pollution resistance and acid resistance in addition to the hardness and the processing property have recently been regarded as important.

In conventional polyester resin-methyl etherified methylol melamine resin coating compositions, the pollution resistance of the coating film can generally be improved by increasing the amount of the methyl etherified methylol melamine resin, or by increasing the amount of the curing catalyst. However, such increases in resin and/or catalyst may cause the processing properties and, most particularly the acid resistance of the coating film may become noticeably deteriorated.

SUMMARY OF THE INVENTION

An object of the present invention, therefore, is to obtain a coating composition suitable for use in coated steel plates that is capable of forming a coating film having beneficial and/or improved coating surface appearance, hardness, processing property, pollution resistance and acid resistance properties.

In accordance with these and other objectives, there is provided a coating composition comprising:

(A) 65 to 95 parts by weight of a hydroxyl group-containing polyester resin having a number average molecular weight of 1,500 to 30,000, a glass transition temperature of –20° to 40° C. and a hydroxyl value of 3 to 50 mgKOH/g;

(B) 5 to 35 parts by weight of a melamine resin curing agent comprising a methyl etherified melamine resin and a butyl etherified melamine resin, wherein the melamine resin comprises 50 to 99% by weight based on the weight of the curing agent of the methyl etherified melamine resin, and 1 to 50% by weight based on the weight of the curing agent of the butyl etherified melamine resin, wherein the total parts by weight of (A) and (B) equal 100;

(C) 0.1 to 2.0 parts by weight based on the total weight of (A) and (B) in the composition, of a curing catalyst comprising an optionally neutralized sulfonic acid compound; and (D) 0.3 to 10 parts by weight based on the total weight of (A) and (B), of a secondary amine compound having a boiling point of 30° to 250° C.

Furthermore, the present invention is also directed to a coated metal plate comprising a cured coating film of the above coating composition that is formed on a metal plate that may optionally be formed using a primer coating film.

DETAILED DESCRIPTION OF PREFERRED EMBODIMENTS

The present inventors have found that the present objects can be achieved, for example, by blending a polyester resin and a mixed melamine resin of a methyl etherified melamine resin and a butyl etherified melamine resin as suitable melamine resins with a sulfonic acid curing catalyst, a specific secondary amine compound and a specific titanium white as a polyestermelamine resin coating composition, and in consequence, the present invention has now been completed.

The coating composition of the present invention comprises components (A)–(D) as described herein.

Polyester Resin (A)

A polyester resin comprising component (A) in the coating composition of the present invention is generally a polyester resin having one or more hydroxyl groups. Examples of the polyester resin include oil-free polyester resins, oil modified alkyd resins and modified resins thereof such as urethane modified polyester resins, urethane modified alkyd resins and epoxy modified polyester resins.

The above oil-free polyester resins generally comprise an esterified compound of a polybasic acid component and a polyhydric alcohol component. Examples of usable polybasic acid component include dibasic acids such as phthalic anhydride, isophthalic acid, terephthalic acid, tetrahydrophthalic anhydride, hexahydrophthalic anhydride, succinic acid, fumaric acid, adipic acid, sebacic acid and maleic anhydride, and lower alkyl esterified compounds of these acids. The term "lower alkyl" refers to $C_1$–$C_4$. These polybasic acid components can be used singly or in a combination of two or more. If necessary, any monobasic acids such as benzoic acid, crotonic acid and p-t-butylbenzoic acid, and polybasic acids having 3 or more valences such as trimellitic anhydride, methylcyclohexenetricarboxylic acid and pyromellitic anhydride can be used together. Examples of suitable polyhydric alcohol components include divalent alcohols such as ethylene glycol, diethylene glycol, propylene glycol, 1,4-butanediol, neopentyl glycol, 3-methylpentanediol, 1,4-hexanediol and 1,6-hexanediol, and if necessary, polyhydric alcohols having 3 or more valences such as glycerin, trimethylolethane, trimethylolpropane and pentaerythritol can be used together. These polyhydric alcohols can be used singly or in a mixture of two or more. The esterification or the ester exchange reaction of both the components can be carried out by a known method. Isophthalic acid, terephthalic acid and lower alkyl esterified compounds of these acids are particularly preferable.

The alkyd resin is preferably a resin that can be prepared, for example, from the acid component of the above oil-free polyester resin, the alcohol component and an oil fatty acid by a known reaction. Examples of suitable oil fatty acids include coconut oil fatty acid, soybean oil fatty acid, linseed oil fatty acid, safflower oil fatty acid, tall oil fatty acid, dehydrated castor oil fatty acid and tung oil fatty acid. The oil length, of the alkyd resin, i.e., the proportion of fat oil in the resin, is preferably 30% or less, more preferably about 5 to 20%.

Examples of suitable urethane modified polyester resins include resins prepared by reacting, in accordance with a known method, polyisocyanate compounds with the above oil-free polyester resins or any with low molecular weight oil-free polyester resins. Such resin may be obtained, for example, by reacting acid components and alcohol components for use in the manufacture of the above oil-free polyester resins. Moreover, examples of suitable urethane modified alkyd resins include resins prepared, for example, by reacting, in accordance with a known method, polyisocyanate compounds with the above alkyd resins or with low molecular weight alkyd resins which may be obtained by reacting some components for use in the manufacture of the above alkyd resin. Examples of suitable polyisocyanate compounds which can be used for the manufacture of the urethane modified polyester resins and the urethane modified alkyd resins include hexamethylene di-isocyanate, isophorone di-isocyanate, xylylene di-isocyanate, tolylene di-isocyanate, 4,4'-diphenylmethane di-isocyanate, 4,4'-methylenebis (cyclohexyl isocyanate) and 2,4,6-triisocyanatotoluene. As the above urethane modified resin, it is possible to employ, for example, any resin having a modification degree that the amount of the polyisocyanate compound constituting the urethane modified resin is 30% by weight or less with respect to the weight of the urethane modified resin.

Examples of epoxy modified polyester resins include reaction products (by a reaction such as addition, condensation or graft) of polyester resins and epoxy resins. For example, a reaction product of a resin having an epoxy group and a carboxyl group of a polyester resin prepared from one or more components used in the manufacture of the above polyester resin can be used. In addition, a product obtained by bonding a hydroxyl group in the polyester resin to a hydroxyl group in the epoxy resin via the polyisocyanate compound is also suitable. The modification degree of a suitable epoxy modified polyester resin may be such that the amount of the epoxy resin is the range of 0.1 to 30% by weight with respect to the weight of the epoxy modified polyester resin.

Among the polyester resins mentioned above, the oil-free polyester resins are particularly suitable.

The polyester resin (A) preferably has a number average molecular weight of 1,500 to 30,000, most preferably 5,000 to 25,000. The resin (A) preferably has a glass transition temperature (a Tg point) of −20° to 40° C., most preferably −10° to 30° C., and also preferably possesses a hydroxyl value of 3 to 50 mgKOH/g, most preferably 5 to 30 mgKOH/g.

In the present invention, the glass transition temperature (a Tg point) is measured by a differential thermal analysis (DTA), and the number average molecular weight is measured by the use of a gel permeation chromatography (GPC) and a standard polystyrene calibration curve.

With regard to the polyester resin (A), if the number average molecular weight is less than about 1,500, the processing properties may be poor. On the other hand, if the N.A. molecular weight is more than about 30,000, the crosslinking degree of the resulting coating film may be low, and pollution resistance and blocking resistance may also be poor. Blocking resistance generally refers to the strength of the coating when subjected to acid or other such agent. If the Tg point is less than about −20° C., the obtained coating film may have a low hardness and poor pollution resistance. On the other hand, if the Tg is more than about 40° C., the processing properties of the obtained coating film may be insufficient. Furthermore, if the hydroxyl value is less than about 3 mgKOH/g, the crosslinking degree of the obtained coating film will tend to be low, and the pollution resistance and the blocking resistance may also be poor. On the other hand, if the hydroxyl value is more than about 50 mgKOH/g, the processing properties of the coating film may be poor. In fact, the coated film may become shrinked and/or uneven and the coated film will generally not possess the desired smoothness.

Melamine Resin Curing Agent (B)

The melamine resin curing agent comprises component (B) in the composition of the present invention may be a mixed melamine resin of a methyl etherified melamine resin and a butyl etherified melamine resin.

Examples of the above methyl etherified melamine resin include a methylated melamine resin obtained, for example, by etherifying, with methanol alone, a part or all methylol groups in a methylol melamine resin (which may be an addition reaction product and may be either a monomer or a polymer) of melamine and an aldehyde component such as formaldehyde or paraformaldehyde. Alternatively, a melamine resin may be used that is obtained by etherifying a part or all methylol groups in a methylol melamine resin with both methanol and another alcohol having 2 to 4 carbon atoms (such as ethanol, isopropanol, n-propanol, n-butanol or isobutanol). The methyl etherified melamine resin can be used alone or in mixtures of two or more resins.

With regard to the above methyl etherified melamine resin, it is preferred that the number of the methyl etherified methylol groups is 3.0 or more per triazine nucleus, and the number average molecular weight is 1,000 or less. This is because the compatibility of the melamine resin with the polyester resin (A) is optimized under these conditions, and the pollution resistance and processing property of the obtained coating film are also benefitted.

Examples of commercially available products of the above preferable methyl etherified melamine resin include methylated melamine resins such as CYMEL 300, CYMEL 303, CYMEL 325, CYMEL 327, CYMEL 350, CYMEL 730, CYMEL 736 and CYMEL 738 (Mitsui Cytec Co., Ltd.), MELAN 522 and MELAN 523 (Hitachi Chemical Co., Ltd.), NIKALACK MS001, NIKALACK MX430 and NIKALACK MX650 (Sanwa Chemical Co., Ltd.), SUMIMAL M-55, SUMIMAL M-100 and SUMIMAL M-408 (Sumitomo Chemical Co., Ltd.), and RESIMIN 740 and RESIMIN 747 (Monsanto Co., Ltd.); and mixed etherified melamine resins of methyl ether and butyl ether such as CYMEL 232, CYMEL 266, CYMEL XV-514 and CYMEL 1130 (Mitsui Cytec Co., Ltd.) NIKALACK MXS00, NIKALACK MX600 and NIKALACK MS95 (Sanwa Chemical Co., Ltd.), RESIMIN 753 and RESIMIN 755 (Monsanto Co., Ltd.), and SUMIMAL M-66B (Sumitomo Chemical Co., Ltd.).

The butyl etherified melamine resin which is mixed with the methyl etherified melamine resin, when used, may be a melamine resin obtained by etherifying, with n-butyl alcohol or isobutyl alcohol, a part or all methylol groups in a methylol melamine resin (which may be an addition reaction product and either a monomer or a polymer) of melamine and an aldehyde component such as formaldehyde or paraformaldehyde. The number average molecular weight of the melamine resin is preferably in the range of 800 to 8,000, more preferably 1,000 to 3,000 so that the coating composition stability and the pollution resistance of the obtained coating composition are optimized. The butyl etherified melamine resins can be used alone or in the form of a mixture of two or more resins.

Examples of commercially available products of the preferred butyl etherified melamine resins include U-VAN 20SE and U-VAN 225 (Mitsui Toatsu Chemicals, Inc.), SUPERBECKAMIN J820-60, SUPERBECKAMIN L-117-60, SUPERBECKAMIN L-109-65, SUPERBECKAMIN 47-508-60, SUPERBECKAMIN L-118-60 and SUPERBECKAMIN G821-60 (Dainippon Ink & Chemicals, Inc.).

The melamine resin curing agent (B) in the composition of the present invention may be a mixture of the methyl etherified melamine resin (the former) and the butyl etherified melamine resin (the latter). From the standpoint of the blocking resistance, the processing property, the coating film hardness, the pollution resistance and the like, the percentage of solids of the former based on the total amount of solids in both the resins is preferably in the range of 50 to 99% by weight, more preferably 70 to 95% by weight. When the methyl etherified melamine resin is used together with the butyl etherified melamine resin, the butyl etherified melamine resin (which is generally poor in compatibility with the polyester resin (A)) transfers to the surface of the coating film. Thus, the cured film can typically exert excellent pollution resistance properties and can also advantageously impart the property of coating film hardness. Crosslinking in the coating film may be carried out, for example, mainly by using a methyl etherified melamine resin, so that optimum processing properties of the coating film can also be maintained.

Curing Catalyst (C)

A curing catalyst (C) may be blended for the purpose of promoting the curing reaction of the polyester resin (A) and the melamine resin curing agent (B). The curing catalyst (C) is preferably a sulfonic acid compound or a neutralized sulfonic acid compound. Typical examples of the sulfonic acid compound include p-toluenesulfonic acid, dodecylbenzenesulfonic acid, dinonylnaphthalenesulfonic acid and dinonylnaphthalenedisulfonic acid. Examples of suitable neutralizing agents for use in the neutralization of the sulfonic acid compound include basic compounds such as primary amines, secondary amines, tertiary amines, ammonia, caustic soda and caustic potash. Secondary amines are most preferable. Examples of suitable secondary amines include diethylamine, di-n-propylamine, di-isopropylamine, di-n-butylamine, di-isobutylamine, di-t-butylamine, dihexylamine, di(2-ethylhexyl)amine and N-isopropyl-N-isobutylamine. As the curing catalyst (C), a neutralized secondary amine of p-toluenesulfonic acid and/ or a neutralized secondary amine of dodecylbenzenesulfonic acid are particularly preferred, and tend to positively influence the coating film stability, the reaction acceleration effect and the physical properties of the obtained coating film.

Secondary Amine Compound (D)

The secondary amine compound (D) is preferably a secondary amine having a boiling point of 30° to 250° C. Typical examples of the secondary amine compound (D) include diethylamine, di-isopropylamine, di-n-propylamine, diallylamine, diamylamine, di-n-butylamine, di-isobutylamine, di-sec-butylamine, N-ethyl-1,2-dimethylpropylamine, N-methylhexylamine, di-n-octylamine, piperidine, 2-picoline, 4-picoline, 2,4-, 2,5- and 3,5-rupetidines, dimethyloxazoline and 3-piperidinemethanol.

Preparation and Coating of Coating Composition

The coating composition of the present invention can be prepared by mixing the polyester resin (A), the melamine resin curing agent (B), the curing catalyst (C) and the secondary amine compound (D).

The preferred ratio between the polyester resin (A) and the melamine resin curing agent (B) is based on the assumption that the total solid content of the components (A) and (B) is 100 parts by weight. That is, as referred to herein, components (A) and (B) are present in total amount equal to 100 parts by weight.

The polyester resin (A): preferably 65 to 95 parts by weight, most preferably 70 to 85 parts by weight.

The melamine resin curing agent (B) : preferably 5 to 35 parts by weight, most preferably 15 to 30 parts by weight.

With regard to the above blend ratio, if the amount of the polyester resin (A) is less than about 65 parts by weight (if the amount of the melamine resin curing agent (B) is more than about 35 parts by weight), the obtained cured coating film may be poor in processing properties and acid resistance. On the other hand, if the amount of the polyester resin (A) is more than about 95 parts by weight (if the amount of the melamine resin curing agent (B) is less than about 5 parts by weight), the obtained cured coating film may be poor in the pollution, resistance and blocking resistance.

The amount of the curing catalyst (C) is preferably in the range of 0.1 to 2.0 parts by weight, most preferably 0.2 to 1.5 parts by weight based on 100 parts by weight, of the polyester resin (A) and the melamine resin curing agent (B) . Here, the amount of the sulfonic acid compound means the amount of sulfonic acid itself as the curing catalyst from which the neutralizing agent is removed, if the curing catalyst is a neutralized sulfonic acid compound. When the curing catalyst is the acid itself, the amount of the acid refers to its actual weight. If the amount of the curing catalyst (C) to be blended is less than about 0.1 part by weight in terms of the sulfonic acid compound, the promotion effect of the reaction between the polyester resin (A) and the melamine resin curing agent (B) may not be enough. On the other hand, if the amount of the curing catalyst (C) is more than about 2.0 parts by weight, the processing properties and water resistance of the obtained coating film may be poor.

The amount of the secondary amine compound (D) to be blended is preferably in the range of 0.3 to 10 parts by weight, most preferably 0.5 to 5 parts by weight with respect to the total amount, 100 parts by weight, of the polyester resin (A) and the melamine resin curing agent (B). If the amount of the secondary amine compound (D) to be blended is less than about 0.3 part by weight, the improvement in the property of pollution resistance may not be sufficient. On the other hand, if it is more than about 10 parts by weight, the hardness may be poor and the coating film hardness is also low.

The coating composition of the present invention preferably comprises the polyester resin (A), the melamine resin curing agent (B), the curing catalyst (C) and the secondary amine compound (D). From the standpoint of optimizing handling and coating properties, an organic solvent may optionally be added. As the organic solvent, a solvent may optionally be used that can dissolve the above components (A), (B), (C) and (D). Typical examples of suitable organic solvents include hydrocarbon solvents such as toluene, xylene and high-boiling petroleum hydrocarbons, ketone solvents such as methyl ethyl ketone, methyl isobutyl ketone, cyclohexanone and isophorone, ester solvents such as ethyl acetate, butyl acetate, ethylene glycol monoethyl ether acetate and diethylene glycol monoethyl ether acetate, alcohol solvents such as methanol, ethanol and butanol, and ether alcohol solvents such as ethylene glycol monoethyl ether, ethylene glycol monobutyl ether and diethylene glycol monobutyl ether. These organic solvents can be used alone or in mixtures of two or more.

Furthermore, the coating composition of the present invention, if necessary, may contain one or more of the following: a coloring pigment; a glittery pigment such as an aluminum powder, a copper powder, a nickel powder, a titanium oxide coated mica powder, an iron oxide-coated mica powder or a graphite powder; an extender pigment such as talc, clay, silica, mica or alumina; and/or an additive such as an anti-foaming agent or a coating surface regulator (which is sometimes referred to as the additive for the coating composition).

Examples of suitable coloring pigments include coloring pigments that are usually used in the field of the coating composition, for example, white pigments such as titanium white and zinc flower; organic red pigments such as CYANINE BLUE, CYANINE GREEN and azo compounds and quinacridone compounds; organic yellow pigments such as benzimidazolone compounds, isoindolinone compounds, isoindolin compounds and quinophthalone compounds; and inorganic coloring pigments such as titanium yellow, red oxide, carbon black, yellow lead and various calcined pigments.

A preferable example of the white pigment is a silica-free titanium white obtained using rutile type titanium oxide particles (usually, having a primary particle diameter of about 0.2 to 0.3 $\mu$m). It is preferable that coarse particles having diameters of 0.5 $\mu$m or more be removed by particle regulation or classification. The titanium oxide particles are typically coated with zirconia, alumina and if necessary, titania. The resulting coating films employing such titanium white tend to be excellent in acid resistance.

The rutile type titanium oxide particles from which the coarse particles have been removed can be obtained as follows. For example, a rutile crystalline titanium oxide material having a primary particle diameter of about 0.2 to 0.3 $\mu$m may be first formed by a method which comprises hydrolyzing a titanium sulfate solution or a titanium tetrachloride solution to form a hydrolyzed cake, and the cake is then burned. Alternatively, another method which comprises heating and oxidizing titanium tetrachloride in a gaseous phase can be used. Next, the formed titanium oxide material may be subjected to dry grinding, for example, by a hammer mill or a Raymond mill, or to wet grinding, for example, by a ball mill or a sand mill, to finely grind the material. The coarse particles having diameters of about 0.5 $\mu$m or more are then sufficiently classified and preferably removed by centrifugal separation or the like to obtain the rutile type titanium oxide particles.

The rutile type titanium oxide particles from which the coarse particles have been removed are preferably coated with zirconia. The coating amount of zirconia is preferably in the range of 0.2 to 1.5% by weight, most preferably 0.3 to 1.0% by weight based on the weight of the titanium oxide particles. Next, the particles are preferably coated with alumina so that the coating amount of alumina is preferably in the range of 1.5 to 8.0% by weight, most preferably 2.0 to 5.0% by weight based on the weight of the titanium oxide particles. Furthermore, the coating weight ratio of alumina/zirconia is suitably in the range of 2/1 to 10/1. Consequently, a titanium white can be obtained wherein the zirconia coating layer is formed as an inner layer and the alumina coating layer is formed as an outer layer.

A titanium white, which has been subjected to the above coating treatment, has an alumina coating layer present as the outer layer. Hence, the titanium white easily becomes wet; thus, the dispersibility of the pigment is generally good. In addition, the combination of a zirconia coating layer as an inner layer and the alumina coating layer as an outer layer can contribute to the improved acid resistance.

The coating treatment of the rutile type titanium oxide particles with zirconia and alumina can be carried out in a known manner. For example, an aqueous zirconium sulfate solution may be added to an aqueous slurry of the rutile type titanium oxide particles. After stirring, a basic solution such as an aqueous sodium hydroxide solution may then be added to raise the pH to about 4. Thereafter, a hydrate of zirconia can be deposited on the surfaces of the titanium oxide particles. Next, to the obtained deposited titanium oxide slurry, for example, an aqueous sodium aluminate solution may be added. After stirring, an acidic solution such as an aqueous sulfuric acid solution may be added to the solution to lower the pH to between about 6–7. Afterward, if necessary, heating, pH adjustment and aging can be carried out to deposit a hydrate of alumina as the outer layer. Next, after filtration and washing, the resulting titanium oxide cakes to which the titanium oxide particles have been coated may be dried, and the cakes may then be dissociated by using a fluid energy mill or the like to obtain titanium white having the desired coating layers of zirconia and alumina.

In the above coating treatment, the procedure can be carried out so that a titania layer may be formed between the zirconia layer and the alumina layer. A titanium white including a titania layer can generally exhibit similar performance to the above described coated titanium oxide. The titania layer can be formed, for example, by the same procedure as in the formation method of the zirconia coating layer except that the aqueous zirconium-sulfate solution may be used in the same way or replaced with an aqueous titanium sulfate solution. The amount of titania to be coated is preferably by weight or less, most preferably 1.0% by weight or less based on the weight of the titanium oxide particles. In yet a further embodiment, the titanium oxide particles can be coated with silica as well as one or more of zirconia, alumina or titania.

The composition of the present invention can be applied onto various articles to be coated such as metal plates, plastic plates and glass plates. Examples of metal plates which can be used as the articles to be coated include cold rolled steel plates, zinc or zinc alloy plated steel plates and aluminum plates. Most preferably zinc or zinc alloy plated steel plates can be used. Examples of suitable the zinc or zinc alloy plated steel plates include hot dipped galvanized steel plates, electrically galvanized steel plates, iron-zinc alloy plated steel plates, nickel-zinc alloy plated steel plates and aluminum-zinc alloy plated steel plates (e.g., plated steel plates having trade names of "GALVALUME", "GALFAN" and the like) as well as chemically treated galvanized steel plates obtained by subjecting these zinc or zinc alloy plated steel plates to a chemical treatment such as a zinc phosphate treatment or a chromate treatment. Furthermore, for the purpose of improving anticorrosion and coating composition adhesion properties, primer coated metal plates on which a primer coating film has been formed can also be used as the articles to be coated. A suitable primer coating film may be obtained from a polyester primer or an epoxy primer, and in general, the primer coating film preferably has a thickness of 2 to 10 $\mu$m.

No particular restriction is put on a coating technique of the coating composition according to the present invention. For example, roll coating, curtain flow coating, immersion coating or spray coating can be employed. The coating film thickness is usually in the range of 5 to 30 $\mu$m, particularly 10 to 25 $\mu$m in terms of a dry coating film thickness. Furthermore, curing conditions of the above coating composition can suitably be selected from baking conditions for curing the coating composition. If a long metal plate or primer coated metal plate which is continuously moved is continuously coated with the coating composition by roll coating or the like, the maximum temperature of the metal plate (PMT) is preferably in the range of 160° to 260° C. and the time is preferably in the range of 15 to 90 seconds. The PMT is most preferably in the range of 190° to 230° C., and the time is most preferably in the range of 20 to 60 seconds.

EXAMPLES

The present invention is described in more detail with reference to examples. The terms "part(s)" and "%" all are based on weight.

Preparation of Coated Titanium White

Preparation Example 1

A hydrolyzed cake obtained by hydrolyzing a titanium sulfate solution was calcined, and a rutile crystalline titanium oxide material having a primary particle diameter of 0.27 $\mu$m was finely dry-ground. Furthermore, sufficient classification was carried out by centrifugal separation to remove coarse particles having particle diameters of 0.5 $\mu$m or more, and 350 g of the titanium oxide material was then dispersed in 1000 g of water to obtain an aqueous slurry.

To this aqueous slurry, an aqueous zirconium sulfate solution was added to yield about 1% by weight of $ZrO_2$ with respect to the weight of the titanium oxide material, and after sufficient stirring, the pH of the slurry was adjusted to 4 with a sodium hydroxide solution. Afterward, aging was carried out for 10 minutes to deposit a hydrate of zirconia on the surfaces of the titanium oxide particles.

Next, to the deposited zirconia hydrate, an aqueous sodium aluminate solution was added to yield about 3% by weight of $Al_2O_3$ with respect to the weight of the titanium oxide material, and after sufficient stirring, the pH of the slurry was adjusted to 7.0 with an aqueous sulfuric acid solution. Afterward, the temperature of the slurry was raised up to 70° C., followed by aging for 30 minutes, to deposit a hydrate of alumina.

Furthermore, filtration and washing were repeated several times, and the thus treated titanium oxide cake was then dried at 110 to 120° C. After water was sufficiently removed, the dried cake was dissociated by means of a fluid energy mill to obtain a titanium white (a) in which the titanium oxide particles were coated with zirconia and alumina.

Preparation Example 2

After a hydrate of zirconia was deposited on the surfaces of titanium oxide particles in Preparation Example 1, an aqueous titanium sulfate solution was added to yield about 0.5% by weight of $TiO_2$ with respect to the weight of the titanium oxide particles and an aqueous sodium hydroxide solution was simultaneously added thereto over 10 minutes so that the pH of the system might be kept up in the range of 5 to 7. Moreover, the pH of the slurry was adjusted to 7 with an aqueous sodium hydroxide solution, followed by aging for 10 minutes, to deposit a hydrate of titania on the zirconia hydrate layer.

On this titania hydrate, a hydrate of alumina was deposited by the same procedure as in Preparation Example 1, and afterward the same procedure as in Preparation Example 1 was then conducted to obtain a titanium white (b) in which the titanium oxide particles were coated with zirconia, titania and alumina.

Preparation Example 3

An aqueous slurry used in Preparation Example 1 was heated up to 70°–80° C., and an aqueous sodium silicate solution was slowly added with stirring over 2 hours to yield about 4% by weight of $SiO_2$ with respect to the weight of titanium oxide particles together with an aqueous sulfuric acid solution, while the pH of the system was maintained at 8 to 9. Afterward, the pH of the system was adjusted to 7 with the aqueous sulfuric acid solution, followed by aging for 30 minutes, to deposit a hydrate of silica on the surfaces of the titanium oxide particles.

Next, an aqueous sodium aluminate solution was slowly added thereto with stirring to yield about 2% by weight of $Al_2O_3$ with respect to the weight of the titanium oxide particles together with an aqueous sulfuric acid solution, while the pH of the system was maintained at 6 to 8. Afterward, the pH of the system was adjusted to 7 with the aqueous sulfuric acid solution, and the solution was heated up to 70° C., followed by aging for 30 minutes, to deposit a hydrate of alumina on the outer layer. Furthermore, the same process as in Preparation Example 1 was conducted to obtain a titanium white (c) in which the titanium oxide particles were coated with silica and alumina.

Examples 1 to 8 and Comparative Examples 1 to 4

Topcoating compositions were obtained in accordance with composition blends shown in Table 1 given below. Next, HP color 8620 primer (a polyester primer for pre-coated steel plates; Kansai Paint Co., Ltd.) was applied onto electrically galvanized steel plates having a thickness of 0.5 mm treated with a chromate so that a dry film thickness of the primer might be about 4 $\mu$m, and the primer was then baked for 30 seconds so that a PMT might be 220° C., to obtain primer coated steel plates. The above coating compositions were applied onto the primer coated steel plates by a bar coater so that a dry film thickness might be about 18 $\mu$m, and were then baked for 45 seconds so that the PMT might be 220° C., to obtain topcoated steel plates. For the thus obtained coated steel plates, various tests were carried out.

The results of the tests are shown in Table 3. The amounts of polyester resins and melamine resins in Table 1 were based on solid weight, and the amounts of curing catalysts were represented by weight in terms of the amounts of sulfonic acid compounds. In the preparation of the topcoating compositions of the examples and the comparative examples, titanium whites which were white pigments were dispersed. Furthermore, a mixed solvent of cyclohexanone/Swazol 1500 (an aromatic petroleum high-boiling solvent, made by Cosmo Petroleum Co., Ltd.)=60/40 (weight ratio) was used for the viscosity adjustment of the coating compositions. In applying the coating composition, the viscosity of each coating composition was regulated to about 90 seconds (25° C.) with Ford Cup #4.

Example 9

The same procedure as in Example 1 was conducted except that any primer was not applied onto an electrically galvanized steel plate having a thickness of 0.5 mm treated with a chromate and a coating composition having a blend shown in the column regarding Example 9 in Table 1 was directly applied onto this steel plate, thereby obtaining a coated steel plate in which the topcoating film was formed on the plated steel plate without interposing any primer coating film therebetween. Various tests were performed on the coated steel plate. The results are shown in Table 3.

TABLE 1

|  | Example | | | | | | | | | Comparative Example | | | |
|---|---|---|---|---|---|---|---|---|---|---|---|---|---|
|  | 1 | 2 | 3 | 4 | 5 | 6 | 7 | 8 | 9 | 1 | 2 | 3 | 4 |
| (A) Component | | | | | | | | | | | | | |
| VYLON KS-1430V(*1) | 80 | 80 | 80 | 80 |  |  |  |  | 80 | 80 | 80 |  |  |
| VYLON KS-1600V(*2) |  |  |  |  | 90 |  |  |  |  |  |  |  |  |
| VYLON KS-1520V(*3) |  |  |  |  |  | 85 |  |  |  |  |  |  |  |
| VYLON KS-1730V(*4) |  |  |  |  |  |  | 75 | 70 |  |  |  |  | 65 |
| VYLON KS-1660V(*5) |  |  |  |  |  |  |  |  |  |  |  | 80 |  |
| (B) Component | | | | | | | | | | | | | |
| CYMEL 303(*6) | 17 | 17 | 17 | 16 | 7 | 11 | 20 | 25 | 17 | 17 | 17 | 17 | 35 |
| SUPERBECKAMIN J-820-60(*7) | 3 | 3 | 3 | 4 | 3 | 4 | 5 | 5 | 3 | 3 | 3 | 3 | — |
| (C) Component | | | | | | | | | | | | | |
| NACURE 5225(*8) | 1.0 |  | 1.0 | 1.0 | 1.5 | 1.0 | 1.5 | 1.5 | 1.0 | 1.0 | 1.0 | 1.5 | 1.5 |
| p-toluenesulfonic acid |  | 0.7 |  |  |  |  |  |  |  |  |  |  |  |
| (D) Component | | | | | | | | | | | | | |
| Diisobutylamine | 1.0 | 1.5 |  |  | 2.0 |  | 1.0 | 1.0 | 1.0 |  | 1.0 |  |  |
| Di-n-butylamine |  |  |  |  |  | 1.0 |  |  |  |  |  |  |  |
| Diisopropylamine |  |  | 1.0 |  |  |  |  |  |  |  |  |  |  |
| Di-n-propylamine |  |  |  | 4.0 |  |  |  |  |  |  |  |  |  |
| Hexylamine |  |  |  |  |  |  |  |  |  | 1.0 |  |  |  |
| Triethylamine |  |  |  |  |  |  |  |  |  |  | 1.0 |  |  |
| Pigment | | | | | | | | | | | | | |
| Titanium White | | | | | | | | | | | | | |
| Kind (Preparation Example No.) | No. 1 | No. 1 | No. 2 | No. 1 | No. 3 | No. 1 | No. 2 | No. 1 | No. 1 | No. 1 | No. 1 | No. 1 | No. 1 |
| Amount | 90 | 90 | 90 | 90 | 90 | 90 | 90 | 90 | 90 | 90 | 90 | 90 | 90 |
| Strontium chromate |  |  |  |  |  |  |  |  | 5 |  |  |  |  |

The *items in Table 1 have the following meanings.

The polyester resins labeled (*1) to (*5) in Table 1 are polyester resins (Toyobo Co., Ltd.) which have the following characteristics.

TABLE 2

|  | Number average molecular weight | Glass transition temperature Tg (°C.) | Hydroxyl value (mgKOH/g) |
|---|---|---|---|
| VYLON KS-1430V | 1,2000 | 0.9 | 11 |
| VYLON KS-1600V | 13,800 | 35 | 8 |
| VYLON KS-1520V | 6,400 | 2.3 | 42 |
| VYLON KS-1730V | 22,000 | −1.1 | 14 |
| VYLON KS-1660V | 2,700 | 12 | 98 |

(*6)CYMEL 303 (Mitsui Cytec Co., Ltd.): A low-molecular weight methyl etherified melamine resin has a hexakis (methoxymethyl) melamine content of 60% by weight or more.
(*7)SUPERBECKAMIN J-820-60 (Sainippon Ink & Chemicals, Inc.): An n-butyl etherified melamine resin.
(*8)NACURE 5225 (King Industries Co., Ltd.): A neutralized solution of dodecylbenzenesulfonic acid with an amine.

TABLE 3

|  | Example | | | | | | | | | Comparative Example | | | |
| --- | --- | --- | --- | --- | --- | --- | --- | --- | --- | --- | --- | --- | --- |
|  | 1 | 2 | 3 | 4 | 5 | 6 | 7 | 8 | 9 | 1 | 2 | 3 | 4 |
| Coating surface appearance | ○ | ○ | ○ | ○ | ○ | ○ | ○ | ○ | ○ | ○ | X Shrinkage | Δ Shrinkage | ○ |
| Gloss | 86 | 85 | 85 | 87 | 90 | 88 | 84 | 85 | 84 | 86 | 3.5 | 40 | 84 |
| Pencil hardness | F | F | F | F | H | F | F | F | F | F | F | F | F |
| Adhesive properties | ○ | ○ | ○ | ○ | ○ | ○ | ○ | ○ | ○ | ○ | ○ | ○ | ○ |
| Impact resistance | ○ | ○ | ○ | ○ | ○ | ○ | ○ | ○ | ○ | ○ | ○ | ○ | ○ |
| Folding workability | 0T | 0T | 0T | 0T | 2T | 1T | 0T | 0T | 0T | 0T | 0T | 3T | 2T |
| Solvent resistance | 50< | 50< | 50< | 50< | 50< | 50< | 50< | 50< | 50< | 50< | 50< | 50< | 50< |
| Acid resistance | ◉ | ◉ | ◉ | ◉ | ○ | ◉ | ◉ | ◉ | ○ | ◉ | ◉ | ◉ | Δ |
| Pollution resistance | ◉ | ◉ | ○ | ◉ | ◉ | ◉ | ○ | ◉ | ◉ | X | ○ | ○ | ○ |

The tests in Table 3 were made in accordance with the following test methods.

Test Methods

Coating surface appearance: The appearance of a coating surface (30 cm×30 cm) was observed by the naked eye. The coating surface on which any shrinkage did not occur and any coating defects such as cissing, recesses and clouding were not observed was regarded as good (0). The coating surface on which the shrinkage slightly occurred was regarded as (Δ shrinkage), and the coating surface on which the shrinkage noticeably occurred was regarded as (×shrinkage)

Gloss: A 60° mirror reflectance was measured in accordance with a 60° mirror gloss value prescribed in JIS K-5400 7.6 (1990).

Pencil hardness: On the coating film of the coated plate, a pencil scratch test was made in accordance with JIS K-5400 8.4.2 (1990), and evaluation was then carried out on the basis of a scratch.

Adhesive properties: On the coating surface of a test plate, 11 lengthwise and breathwise parallel straight lines were drawn in accordance with a JIS K-5400 8.5.2 (1990) squares-tape method by a cutter so that the lines might cross each other at right angles and so that the cutter might reach a base material, thereby forming 100 squares each having a size of 1 mm×1 mm. A cellophane adhesive tape was stuck on the surface of the cut test plate, and it was then abruptly peeled therefrom. At this time, a degree of the peeled squares was observed to evaluate on the basis of the following standards.

○: The peeling of the coating film was not observed at all.

Δ: The coating film was slightly peeled, but 90 or more of the squares remained.

x: The coating film was rather peeled, and the number of the remained squares was less than 90.

Impact resistance: In accordance with a JIS K-5400 8.3.2 (1990) Du Pont type impact resistance test, impact was given onto the coating surface of the coated plate under conditions that the weight of a drop weight was 500 g, the tip diameter of an impact core was ½ inch and the height of dropping was 50 cm. Next, a cellophane adhesive tape was stuck on the position on which the impact was given, and the tape was immediately peeled off. At this time, a degree of the peeled coating film was observed to evaluate on the basis of the following standards.

○: Any peeling was not observed on the coating surface.

Δ: The slight peeling was observed on the coating surface.

x: The considerable peeling was observed on the coating surface.

Folding property: In a chamber at 20° C. and 0° C., a test plate was folded as much as 180° so that the coating surface might be an outer side, and a T number at which any crack did not occur at the folded portion was evaluated by the naked eye and it was shown. In the case that the test plate was folded 180° without putting no plate between the folded portions, the T number was 0T; in the case that the test plate was folded putting one plate having the same thickness as that of the test plate therebetween, the T number was 1T; in the case that the test plate was folded putting two plates therebetween, the T number was 2T; . . . ; and similarly, in the case that the test plate was folded putting six plates therebetween, the T number was 6T.

Solvent resistance: In a chamber at 20° C., a gauze impregnated with methyl ethyl ketone was reciprocated in the range of a distance of about 5 cm, a load of about 1 kg/cm² being applied onto the coating surface. The number of the reciprocating motions was recorded until the primer coating film (or a steel plate in the case that the primer coating film was not present) was exposed. A sample which the primer coating film was not exposed even by 50 reciprocating motions was represented by 50<.

Acid resistance: 0.5 cc of an aqueous sulfuric acid solution having a concentration of 10% was dropped on the coating surface, and it was then allowed to stand at 20° C. and RH of 75% for 24 hours. Afterward, the coating surface was washed with water and then observed by the naked eye to evaluate the coating surface on the basis of the following standards.

◉: On the coating surface, defects such as blister and gloss change were not observed.

○: The deterioration of the gloss was slightly observed on the coating surface, but other defects were not recognized.

Δ: The considerable deterioration of the gloss or the slight blister was observed.

x: The noticeable deterioration of the gloss or the noticeable blister was observed.

Pollution resistance: A line was drawn on the coating surface with a red oily ink (trademark "Magic ink" large type red), and it was then wiped out with a gauze impregnated with ethanol. At this time, the remaining ink trace was evaluated by the naked eye.

◉: The ink trace was not observed.

○: The ink trace was slightly observed.

Δ: The ink trace was considerably observed.

x: The ink trace was noticeably observed.

A coating composition of the present invention is a polyester-melamine resin coating composition in which a mixed melamine resin of a methyl etherified melamine resin and a butyl etherified melamine resin as melamine resins is blended with a sulfonic acid curing catalyst and a specific secondary amine compound. According to the coating composition of the present invention, there can be formed a coating film which is excellent in appearance, hardness, processing property, pollution resistance and acid resistance.

While not being bound by any one theory, the inventors of the present invention believe the coating film possesses excellent processing properties and pollution resistance because, inter alia, during baking and curing, the butyl etherified melamine resin transfers to a surface layer portion together with the transfer of the secondary amine compound to a coating film surface. By the distribution of a crosslinking agent, the butyl etherified melamine resin is predominantly present in the surface layer portion and the methyl etherified melamine resin is predominantly present in an inner layer portion. Therefore, the pollution resistance, which is largely affected by the surface layer portion, can be improved by the butyl etherified melamine resin. Moreover, the present inventors believe that since the methyl etherified melamine resin is preferably present in a relatively high ratio in the inner layer portion, the deterioration of processing properties due to the butyl etherified melamine resin does not substantially take place. Furthermore, in the coating composition of the present invention, deterioration of processing properties can be largely inhibited by the use of the secondary amine and the butyl etherified melamine resin. Further, shrinkage occurring on the coating surface can be reduced somewhat by employing the blend of an amine compound.

Additionally, in the coating composition of the present invention, a titanium white is preferably employed as a white pigment in which round rutile titanium oxide particles from which the coarse particles having diameters of 0.5 μm or more have been removed. The titanium white preferably includes a zirconia coating layer containing 0.2 to 1.5% by weight of zirconia with respect to titanium oxide formed as an inert layer, and an alumina coating layer containing 1.5 to 8.0% by weight of alumina with respect to titanium oxide is formed as an outer layer. Hence a coating film can be formed in which the deterioration of acid resistance by a titanium white can be restrained, and thus the acid resistance is excellent.

While the invention has been described in detail with reference to particularly preferred embodiments, those skilled in the art will appreciate that various modifications can be made without departing from the spirit and scope of the invention.

What is claimed is:

1. A coating composition comprising:
   (A) 65 to 95 parts by weight of a hydroxyl group-containing polyester resin having a number average molecular weight of 1,500 to 30,000, a glass transition temperature of −20° to 40° C. and a hydroxyl value of 3 to 50 mgKOH/g;
   (B) 5 to 35 parts by weight of a melamine resin curing agent comprising a methyl etherified melamine resin and a butyl etherified melamine resin, said melamine resin comprising 50 to 99% by weight based on the weight of the curing agent of the methyl etherified melamine resin, and 1 to 50% by weight based on the weight of the curing agent of the butyl etherified melamine resin, wherein the total parts by weight of (A) and (B) equal 100;
   (C) 0.1 to 2.0 parts by weight based on the total weight of (A) and (B) in the composition, of a curing catalyst comprising an optionally neutralized sulfonic acid compound; and
   (D) 0.3 to 10 parts by weight based on the total weight of (A) and (B), of a secondary amine compound having a boiling point of 30° to 250° C.

2. A coating composition according to claim 1, wherein the secondary amine compound (D) comprises a dialkylamine having 2 to 16 carbon a toms.

3. A coating composition according to claim 1, wherein the number average molecular weight of component (A) is from 5,000 to 25,000.

4. A coating composition according to claim 1, wherein the hydroxyl value of component (A) is from 5 to 30 mgKOH/g.

5. A coating composition according to claim 1, wherein the glass transition temperature of component (A) is from −10° to 30° C.

6. A coating composition according to claim 1, wherein said hydroxyl group-containing polyester resin is selected from the group consisting of oil-free polyester resins, oil-modified alkyd resins and modified resins thereof.

7. A coating composition according to claim 1, wherein said polyester resin (A) comprises an oil-free polyester resin comprising an esterified compound of a polybasic acid component and a polyhydric alcohol component.

8. A coating composition according to claim 7, wherein said polybasic acid component comprises one or more acids or acid esters selected from the group consisting of phthalic anhydride, isophthalic acid, terephthalic acid, tetrahydrophthalic anhydride, hexahydrophthalic anhydride, succinic acid, fumaric acid, adipic acid, sebacic acid, maleic anhydride, benzoic acid, crotonic acid, p-t-butylbenzoic acid, trimellitic anhydride, methylcyclohexenetricarboxylic acid and pyromellitic anhydride.

9. A coating composition according to claim 7, wherein said polyhydric alcohol component comprises one or more components selected from the group consisting of ethylene glycol, diethylene glycol, propylene glycol, 1,4-butanediol, neopentyl glycol, 3-methylpentanediol, 1,4-hexanediol, 1,6-hexanediol, glycerin, trimethylolethane, trimethylolpropane and pentaerythritol.

10. A coating composition according to claim 1, further comprising titanium white as a white pigment.

11. A coating composition according to claim 10, wherein said titanium white comprises round rutile titanium oxide particles having a particle diameter of at least 0.5 μm, wherein said titanium oxide particles include (i) a zirconia coating comprising 0.2 to 1.5% by weight of zirconia based on the weight of titanium oxide; and (ii) an alumina coating comprising 1.5 to 8.0% by weight of alumina based on the weight of titanium oxide.

12. A coating composition according to claim 11, wherein said zirconia coating comprises an inner layer and said alumina comprises an outer layer.

13. A coating composition according to claim 10, wherein said titanium white comprises round rutile titanium oxide particles having a particle diameter of at least 0.5 μm, wherein said titanium oxide particles include (i) a zirconia coating comprising 0.2 to 1.5% by weight of zirconia based on the weight of titanium oxide; (ii) a titania coating comprising about at most 1.0% by weight of titania based on the weight of titanium oxide; and (iii) alumina coating comprising 1.5 to 8.0% by weight of alumina based on the weight of titanium oxide.

14. A coating composition according to claim 13, wherein said titania coating is between said zirconia and said alumina, said alumina being present as an outer layer and said zirconia being adjacent to said titanium white.

15. A coating composition according to claim 10, wherein said titanium white comprises round rutile titanium oxide particles having a particle diameter of at least 0.5 μm, wherein said titanium oxide particles include (i) a silica coating comprising about 4% by weight of silica based on the weight of titanium oxide; and (ii) an alumina coating comprising 1.5 to 8.0% by weight of alumina based on the weight of titanium oxide.

16. A coating composition according to claim 15, wherein said silica coating comprises an inner layer and said alumina comprises an outer layer.

17. A coating composition according to claim 1, wherein said methyl etherified melamine resin is prepared by etherifying at least one methylol group in a methylol melamine resin.

18. A coating composition according to claim 17, wherein said methylol melamine resin is an addition product of melamine and an aldehyde.

19. A coating composition according to claim 1, wherein said sulfonic acid compound is selected from the group consisting of p-toluenesulfonic acid, dodecylbenzenesulfonic acid, dinonylnaphthalenesulfonic acid and dinonylnaphthalenedisulfonic acid.

20. A coating composition according to claim 1, wherein said sulfonic acid compound is neutralized by addition of a basic compound selected from the group consisting of primary amines, secondary amines, tertiary amines, ammonia, and caustic soda.

21. A coating composition according to claim 1, further comprising at least one organic solvent.

22. A coating composition according to claim 21, wherein said at least one organic solvent is selected from the group consisting of toluene, xylene, high-boiling petroleum hydrocarbons, methyl ethyl ketone, methyl isobutyl ketone, cyclohexanone, isophorone, ethyl acetate, butyl acetate, ethylene glycol monoethyl ether acetate, diethylene glycol monoethyl ether acetate, methanol, ethanol, butanol, ethylene glycol monoethyl ether, ethylene glycol monobutyl ether and diethylene glycol monobutyl ether.

23. A coated metal plate comprising a cured coating film prepared using a coating composition of claim 1.

24. A coated metal plate according to claim 23, wherein the coating composition is formed on a metal plate using a primer.

* * * * *